United States Patent [19]
Coble

[11] Patent Number: 4,516,758
[45] Date of Patent: May 14, 1985

[54] DIFFUSER SYSTEM FOR ANNEALING FURNACE

[76] Inventor: Gary L. Coble, 12065 Greenwick Rd., Homerville, Ohio 44234

[21] Appl. No.: 456,823

[22] Filed: Jan. 10, 1983

[51] Int. Cl.³ .............................................. F27B 5/06
[52] U.S. Cl. .................................. 266/263; 266/264; 432/260
[58] Field of Search ............... 266/262, 263, 264, 274; 432/260, 254.1, 254.2

[56] References Cited

U.S. PATENT DOCUMENTS

| | | | |
|---|---|---|---|
| 2,849,219 | 8/1958 | Boron | 432/260 |
| 2,998,236 | 8/1961 | Cramer et al. | 266/264 |
| 3,039,784 | 6/1962 | Jones | 432/260 |
| 3,081,074 | 3/1963 | Blackman et al. | 432/260 |
| 3,429,370 | 2/1969 | Blackman | 432/260 |
| 3,693,955 | 9/1972 | Wald et al. | 266/264 |
| 4,287,940 | 9/1981 | Corbett, Jr. | 432/260 |
| 4,310,302 | 1/1982 | Thekdi et al. | 432/205 |

FOREIGN PATENT DOCUMENTS 1131246 6/1962 Fed. Rep. of Germany ...... 266/262

OTHER PUBLICATIONS

Batch Anneal Modeling Study, *Iron and Steel Engineer*, pp. 39–45, vol. 60, No. 6.

*Primary Examiner*—L. Dewayne Rutledge
*Assistant Examiner*—Christopher W. Brody
*Attorney, Agent, or Firm*—David A. Burge

[57] ABSTRACT

A convection diffuser and charge support system for an annealing furnace utilizes a diffuser base, a base-encircling ring, and convector plates which are preferably formed as castings of nodular iron. The diffuser base defines an array of horizontally-extending gas circulation passages which are shielded from above by an integrally-formed, overlying top wall. The top wall prevents debris and other undesirable substances from dropping into and accumulating within the primary flow passages. Vane extension formations project above the top wall and have their upper edges arranged to engage and support a charge of material to be annealed. The ring structure extends perimetrically about the base structure and defines an array of curved, upwardly opening grooves which cooperate with the primary flow passages to direct gases which discharge from the base structure so that the gases flow upwardly, along a generally helical flow paths about a charge of material being annealed. The ring structure may have one or more cast-in-situ cooling passages. The ring structure may be provided with a depending, perimetrically-extending skirt. Where the charge takes the form of a vertical stack of coils of metal, the convector plates are interposed between end regions of adjacent ones of the coils to provide flow paths for ducting gases therebetween. The casting or castings of the ring structure have cast-in-situ cooling conduit formations for ducting cooling fluid therethrough, and depending formations which provide a continuous, downwardly-extending skirt. A novel and improved method is provided for forming nodular iron castings for use in high heat environments and incorporating cast-in-situ cooling conduits.

9 Claims, 9 Drawing Figures

DIFFUSER SYSTEM FOR ANNEALING FURNACE

BACKGROUND OF THE INVENTION

1. Field of the Invention

The present invention relates generally to the heat treating process known as annealing, and, more particularly, to a convection diffuser and charge support system for use in an annealing furnace, and to methods for use in forming selected components of the system from nodular cast iron such that they include cast-in-situ cooling conduits.

2. Prior Art

Annealing is a heat treatment process whereby a charge of material is heated to and held at an elevated temperature for a sufficient length of time to assure that metastable conditions in the material, such as frozen-in strains, dislocations, vacancies, and the like are permitted to achieve thermodynamic equilibrium. With ferrous materials, the term "annealing" is usually used in the sense of a "full" annealing process which involves a change of phase, whereby the metal is heated into the austentic region, and thereafter cooled back to ambient temperature to develop a softened structure of pearlite and ferrite within the metal.

Where the charge of ferrous material being annealed has been cold-worked, the annealing process is used to soften the material to relieve such hardness as has been induced during cold working. Cold-working tends to increase the dislocation density of a metal manyfold. By way of example, a cold-worked piece of metal may have a dislocation density that is $10^6$ greater than that of an unworked specimen of the same material. Since dislocations within cold-worked metal are surrounded by strain fields, the greater the number of dislocations, the greater is the magnitude of the "free energy" which is stored in these strain fields and which can be released during annealing to furnish a driving force that will assist in bringing the dislocation density back to within a desired range.

In order to properly anneal a charge of ferrous material, it is important to confine the charge within an enclosure wherein a non-oxidizing environment is maintained. The gases which define the non-oxidizing environment must be circulated within the enclosure during annealing to assure that convection heat transfer takes place efficiently to enable the annealing process to be carried out in a reasonable period of time. Similarly, during cooling of the charge, proper gas flow is important to effect convection cooling.

Where the charge of material to be annealed takes the form of a plurality of coils of rolled steel, the enclosure utilized to surround and support the charge conventionally includes an annular base structure atop which a vertical stack of the coils of steel to be annealed is supported, with the coils positioned coaxially one atop another. The enclosure also includes a generally cylindrical shroud which cooperates with the base structure to contain the stacked charge of coils and to define an enclosed environment within which hot gases of the controlled environment are caused to circulate.

In conventional practice, a fan is disposed in a centrally-located chamber or hole formed through the base structure for forcing circulation of the gases of the non-oxidizing atmosphere throughout the enclosure. The conventional flow path for circulation includes a flow of gases downwardly through the stack of coils, and upwardly along the outer surfaces of the coils. Convector plates are interposed between adjacent ones of the stacked coils to provide convection flow paths for diverting some of the circulating gases between the ends of adjacent coils. The base structure on which the lowermost coil rests is provided with vanes for directing gases discharged from the fan outwardly and upwardly about the stack of coils.

While the gas circulation passages of a newly-built diffuser base may provide a gas flow pattern that is relatively effective in disbursing gases throughout the enclosure, once the newly-built base has been in service for several months, its flow passages often become deformed due to thermodynamically induced stress which results in creep growth that requires trimming, with the result that the passages no longer operate as intended to properly direct gas flow.

Moreover, inasmuch as the structures which define the vanes of present-day diffuser bases are traditionally formed as weldments of relatively soft steel, the vanes tend to become deformed and/or broken during use, thereby further adding to the inefficiency and unpredictability of a diffuser base after it has been in use for a significant period of time. Thus, present day diffuser bases not only fail to operate efficiently and effectively over long periods of time, but also require frequent checking for structural integrity, cleaning and repair.

SUMMARY OF THE INVENTION

The present invention overcomes the foregoing and other drawbacks of the prior art by providing a durable, novel and improved convection diffuser and charge support system which operates effectively and efficiently over lengthy periods of time while requiring very little in the way of maintenance and repair. A further aspect of the invention relates to novel and improved methods for forming selected components of the system from nodular cast iron, and for incorporating cast-in-situ cooling conduits therein.

In accordance with the preferred practice of the present invention, a diffuser base, an accompanying base-encircling ring, and a plurality of charge-support convector plates are all formed as castings of a particularly durable material known as nodular iron. Nodular iron is cast iron which has been treated while in a molten state with an alloy that contains an element such as magnesium which favors the formation of spheroidal graphite when the cast iron solidifies, whereby the resulting product is more ductile and durable than normal cast iron.

The casting or castings of the diffuser base define a primary set of gas circulation passages which are shielded from above by an integrally-formed overlying top wall. The presence of this overlying wall also serves to strengthen a plurality of upstanding gas-directing vanes which are formed as integral parts of the diffuser base casting or castings, whereby there is much less tendency for deformation and breakage of the vanes. The casting or castings which form the base-encircling ring define an array of curved, upwardly-opening passages that cooperate with the primary flow passages of the diffuser base to direct the gases of the non-oxidizing atmosphere along particularly advantageous, substantially helical flow paths about the periphery of the stack of coils.

By forming the base-encircling ring as a structure which is separate and apart from the diffuser base, the base and the ring are easily separated one from the other for occasional cleaning. Moreover, this feature of separability enables the primary gas flow passages formed in the diffuser base to extend almost entirely horizontally and to thereby be shielded, from above by the top wall of the base to prevent debris from falling into these carefully configured passages. The passages formed in the base-encircling ring comprise, in effect, upwardly-curved extensions of the horizontally-extending primary flow passages formed in the base. When the diffuser base is separated from the ring, the passages of both of these structures are rendered readily accessible for cleaning and maintenance.

A further feature of the invention lies in the use of a generally dish-shaped (i.e., curved) top wall on the base structure which cooperates with a plurality of upwardly-projecting vane-extensions to define an array of secondary flow passages that underlie the lower end of the charge to assure that gases are brought into contact with the lower end of the lowermost coil of the charge.

Other features of the invention lie in the optional use of (1) one or more cast-in-situ cooling conduits provided in the base-encircling ring, and (2) a continuous, depending skirt wall. The cooling conduit or conduits are utilized during the cool-down part of an annealing cycle to assist in cooling such gases as are circulated within the controlled environment. The depending skirt extends into an upwardly-facing annular groove that is conventionally provided in the furnace base. The skirt engages a fibrous refractory sealant positioned in the groove and thereby assists in effecting a gas-tight seal that prevents ambient air from entering the controlled environment. The skirt also shields the surrounded portion of the furnace from deterioration.

Still another feature of the invention lies in the use of specially configured convector plates which promote good gas flow circulation between ends of adjacent coils. The convector plates have curved, scoop-like formations at their inner and outer diameters to assist in positively directing gas circulation along desired paths of flow, and have inner diameters which define restricted orifices that are also utilized to achieve optimum gas flow circulation within the closed, controlled environment.

A novel method which is utilized in the preferred practice of the present invention provides a special casting technique whereby castings of nodular iron which are to be exposed to and utilized in the high temperature environment of a furnace are provided with cast-in-situ cooling conduits. The technique utilizes steel pipes which have been preformed to the desired configuration for the cooling conduits which are to be provided within the nodular iron castings. The pipes are filled with mold sand and positioned in sand molds configured to form the ultimate configuration of the castings, with end portions of the pipes projecting from beyond the confines of the molds for connection to a coolant circulation system. When the mold cavities are filled with molten iron, the pipes become an integral part of the castings without being deformed in the process.

The use of nodular iron castings having cooling conduits formed therein in the manner described is not limited to applications such as annealing furnaces where the castings, thus formed, utilize their cooling passages primarily to perform a cooling of gases which are circulated past the castings; rather, castings thus formed may also be utilized in very high heat environments wherein the circulation of fluid coolant through their conduits serves to prolong the service life of the castings.

BRIEF DESCRIPTION OF THE DRAWINGS

Other features and a fuller understanding of the invention may be had by referring to the following description and claims taken in conjunction with the accompanying drawings, wherein:

DESCRIPTION OF THE PREFERRED EMBODIMENT

Figure 1:
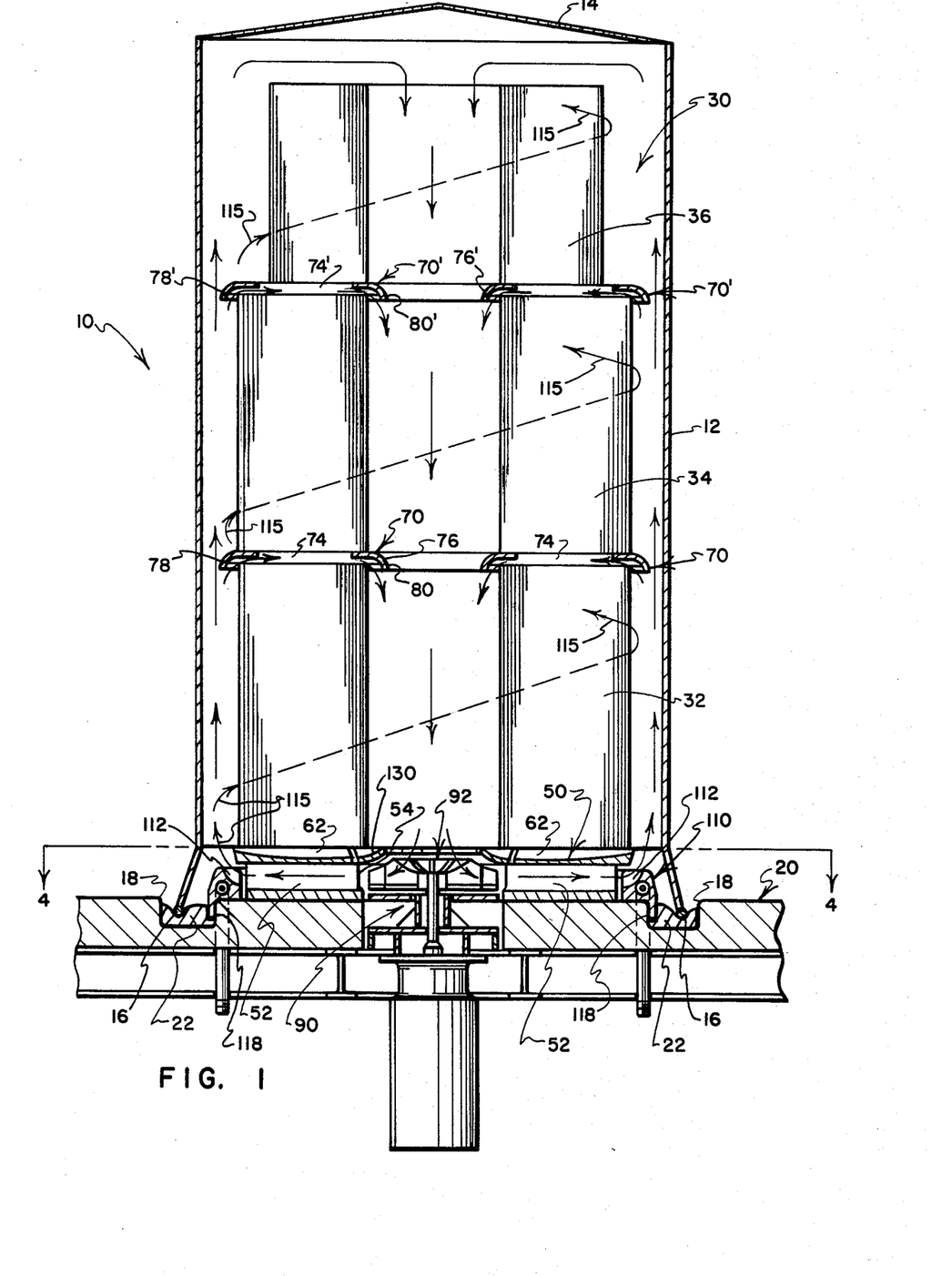
FIG. 1 is a vertical cross-sectional view of portions of a heat-treating apparatus depicting, somewhat schematically, novel and improved features of the convection diffuser and charge support system of the present invention.

Referring to FIG. 1, a heat-treating apparatus embodying features of the preferred practice of the present invention is indicated generally the numeral 10. The apparatus 10 includes a conventional, generally cylindrical enclosure 12 having a closed upper end 14 and an open lower end defined by a rim 16. The rim 16 extends into an upwardly-opening annular groove 18 defined by a conventional support structure 20. The groove 18 is provided with a seal 22 of suitable material such as ceramic fiber refractory to prevent leakage of such gases as are supplied (in a conventional manner by conduits which are not shown) to the interior of the enclosure 12 to form a non-oxidizing atmosphere within the enclosure 12. Housed within the enclosure 12 is a charge 30 of material to be annealed, depicted in FIG. 1 as including a vertical stack 30 of three coils of steel, 32, 34, 36.

In accordance with features of the present invention, a diffuser base and support structure of novel and improved design, indicated generally by the numeral 50 underlies and supports the lowermost of the coils 32. A convector plate 70 is positioned between the coils 32, 34, and an identical convector plate 70' is positioned between the coils 34, 36.

A fan 90 having a rotary impeller 92 is disposed substantially centrally with respect to the diffuser base 50 for circulating non-oxidizing gases within the closed environment of the enclosure 12. The improved diffuser base and support structure 50 is shown somewhat schematically in FIGS. 1 and 2 as defining primary gas flow passages 52 which extend horizontally outwardly from the vicinity of the fan 90 to the vicinity of a surrounding ring structure 110. The ring structure 110 is depicted somewhat schematically in FIGS. 1 and 2 as defining a plurality of gas-directing passages 112 for receiving gases from the primary passages 52 of the diffuser base 50 and for directing these gases upwardly in a helical flow path about the outer surfaces of the stack 30 of coils 32, 34, 36, as is indicated generally by arrows 115.

The diffuser base 50 has a central opening 54 which surrounds the impeller 92 of the fan 90, and which supports an annular insert 130. The insert 130 serves to protectively shield portions of the impeller 92 of the fan 90 and contributes to the efficient flow of gases within the closed, controlled environment.

Figure 4:
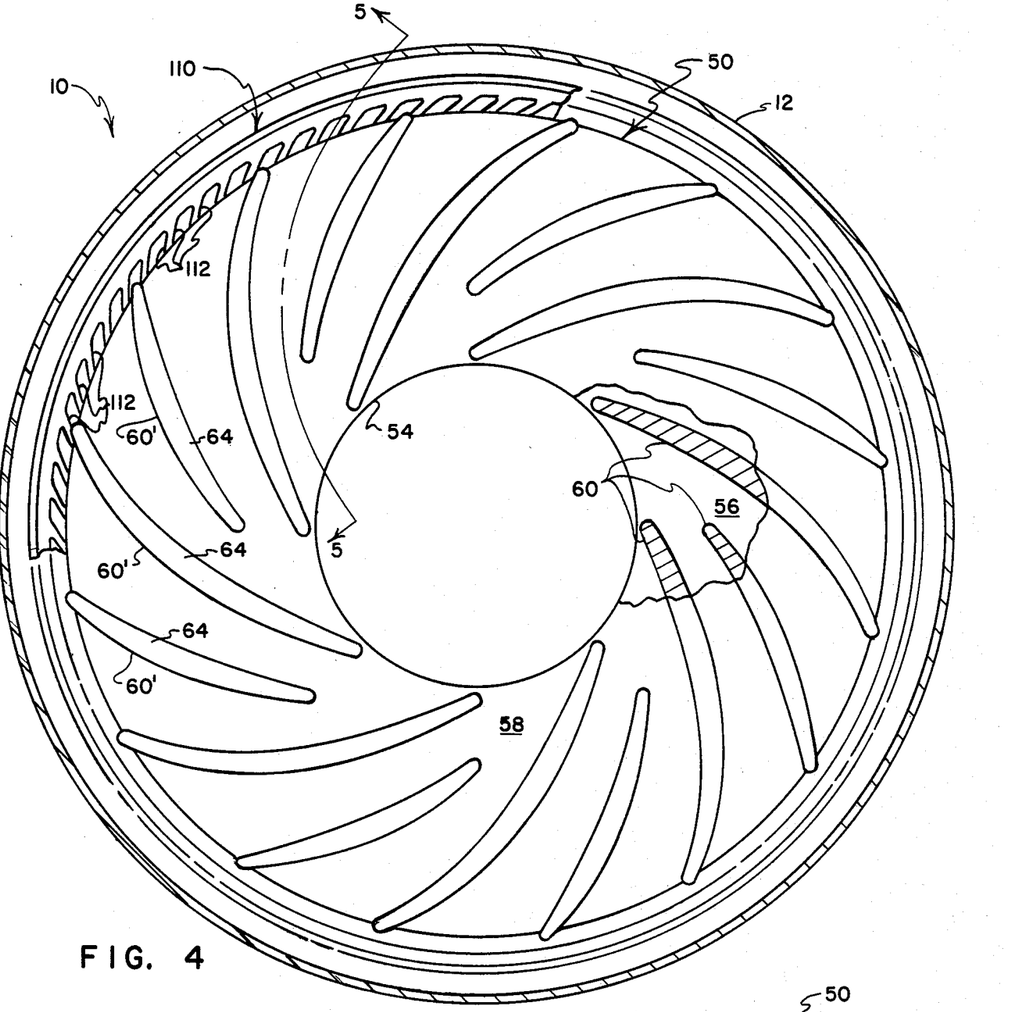
FIG. 4 is a sectional view, on an enlarged scale, as seen from a plane indicated by a line 4—4 of FIG. 1, and presenting a top plan view of a base and portion of a base-encircling ring, but with a small portion of the top wall of the base broken away to permit underlying vane structures to be viewed.
Figure 5:
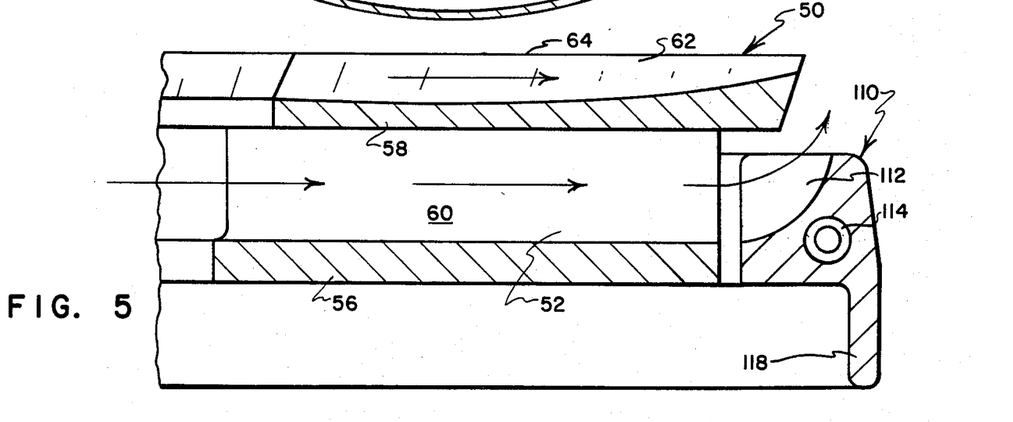
FIG. 5 is a somewhat schematic sectional view as seen from planes indicated generally by a curved line 5—5 in FIG. 4.

Referring to FIGS. 4 and 5, the diffuser base 50 includes a bottom wall 56 of annular, substantially planar configuration, a somewhat dish-shaped annular top wall 58 located at a position spaced above the base wall 56, and a plurality of curved vane formations 60 which extend vertically between the base and top walls 56, 58 to define the primary flow passages 52 which are curved (when viewed from above), shielded, horizontally-extending channels through which gases from the fan impeller 92 are directed outwardly. The top wall 58 extends radially outwardly for a distance that is slightly farther than does the bottom wall 56 (i.e., the outer diameter of the top wall 58 is greater than the outer diameter of the bottom wall 56), whereby the top wall 58 serves to shield radially inward portions of the ring structure 110, including the inner end regions of the curved passages 112 which are formed in the ring structure 110. The base 50 also includes upward extensions 60' of the curved vanes 60 which project upwardly beyond the top plate 58. The extensions 60' exactly overlie the curved vanes 60 and have the same configuration when viewed from above as the vanes 60 would have if viewed in cross section. The vane extensions 60' cooperate with the upper surface of the top wall 58 to define the secondary flow passages 62. The vane extensions 60' have flat upper edges 64 which extend in a common horizontal plane to provide formations for engaging and supporting the lowermost coil 32. As is indicated in FIGS. 2 and 5 by arrows that are positioned in the primary flow passages 52 and in the secondary flow passages 62, gases flow through the passages 52 and 62 in generally radially outward directions, i.e., in directions extending from the radially inward openings of the passages 52, 62 toward radially outward openings thereof.

Figure 6:
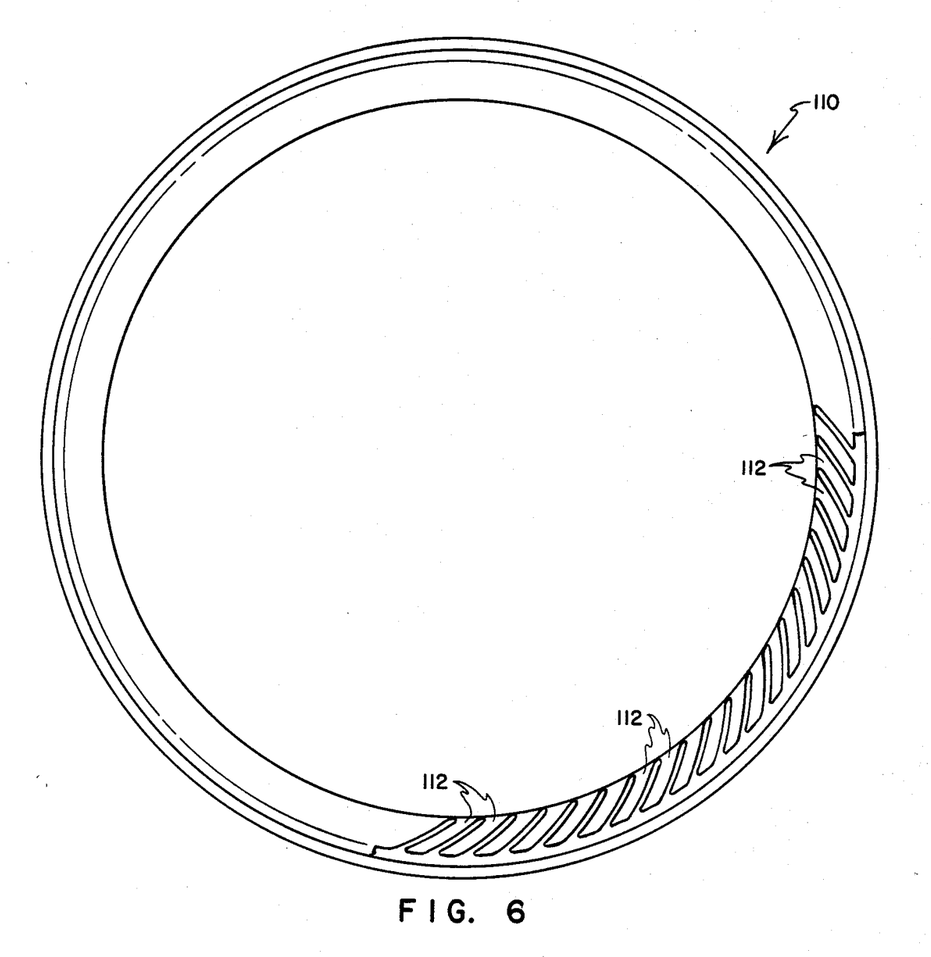
FIG. 6 is a top plan view of portions of the base-encircling ring.

Referring to FIGS. 4-6, the ring structure 110 extends perimetrically about portions of the diffuser base 50 and has a spaced array of grooves (extending along its entire length) which form the curved, upwardly opening passages 112. The passages 112 cooperate with the primary flow passages 52 of the diffuser base 50 to effect an advantageous directing of the flow of gases from the fan 90 radially outwardly and then upwardly along substantially helical flow paths extending about the stack of coils 30, as indicated by the arrows 115.

Figures 2, 3:
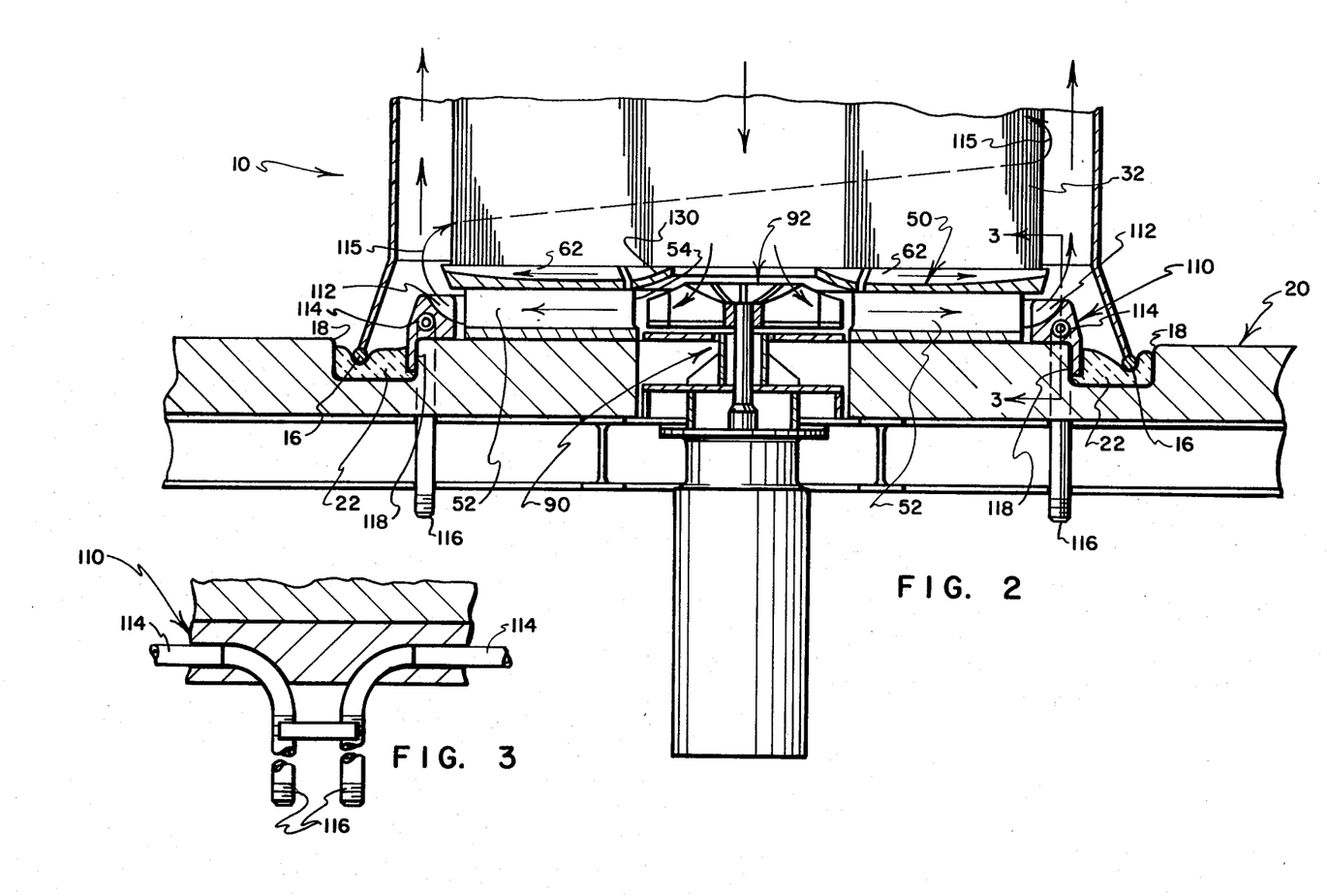
FIG. 2 is an enlargement of a lower portion of the apparatus of FIG. 1.
FIG. 3 is a sectional view as seen from a plane indicated by a line 3—3 in FIG. 2.

As is best seen in FIGS. 2, 3 and 5, the base-encircling ring structure 110 has embedded integrally within it a fluid-cooling conduit 114. The conduit 114 has end portions 116 which depend for connection to a fluid circulation unit (not shown). The cooling conduit 114 is utilized during the cooling part of an annealing cycle to reduce the temperature of the gases being circulated within closed, controlled environment of the enclosure 12.

A feature of the present invention includes a convenient and economical method of providing cooling conduits such as the conduit 114 in nodular iron castings which are to be utilized in high heat environments. In accordance with this aspect of the invention, the desired cooling passages are formed by preforming steel pipes to assume the desired configurations of the cooling conduits, filling the pipes with mold sand, positioning the pipes in sand molds which are configured to form the desired shapes of such nodular iron castings as are required (with the pipes positioned in the molds in the exact positions where it is desired to provide cooling conduits, and with end portions of the pipes projecting beyond the mold cavities defined by the molds), whereafter molten iron is poured into the molds in the conventional manner to form the castings.

Where the described casting technique is applied to the formation of the ring structure 110, it will be understood that a steel conduit 114 is formed to extend in the desired manner through a mold cavity (not shown) which has been configured to form the ring structure 110 (with the end portions 116 projecting outside the mold cavity) so that, when molten iron is poured into the mold cavity, the cooling conduit 114 becomes an integral part of the cast ring structure 110. After pouring and cooling, the casting is removed from the mold, the sand is removed from the interior of the cooling conduit 114, and the ring structure 110 in its completed form is the resulting product.

Figure 7:
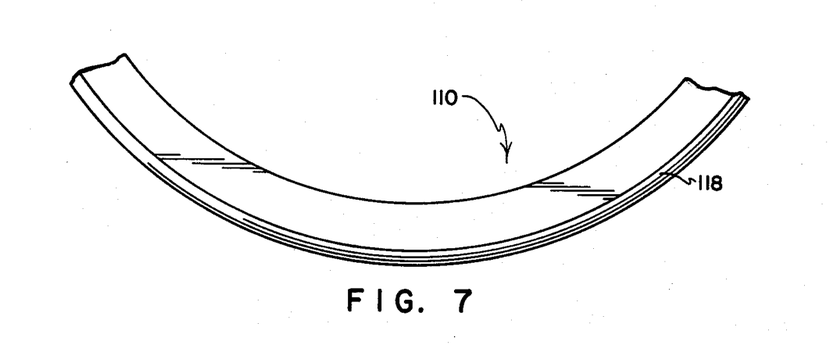
FIG. 7 is a partial bottom plan view of the base-encircling ring.

As is best seen in FIGS. 1, 5 and 7, the ring structure 110 also has, depending from its perimeter, a substantially continuous skirt 118 which extends into the upwardly-opening groove 18 for engaging and sealing with the ceramic fiber refractory material 22 carried within the groove 18. The skirt 118 not only assists in preventing ambient air from entering the closed, controlled environment, but also serves to surround and shield from deterioration such portions of the furnace as underlie the ring structure 110.

Figure 8:
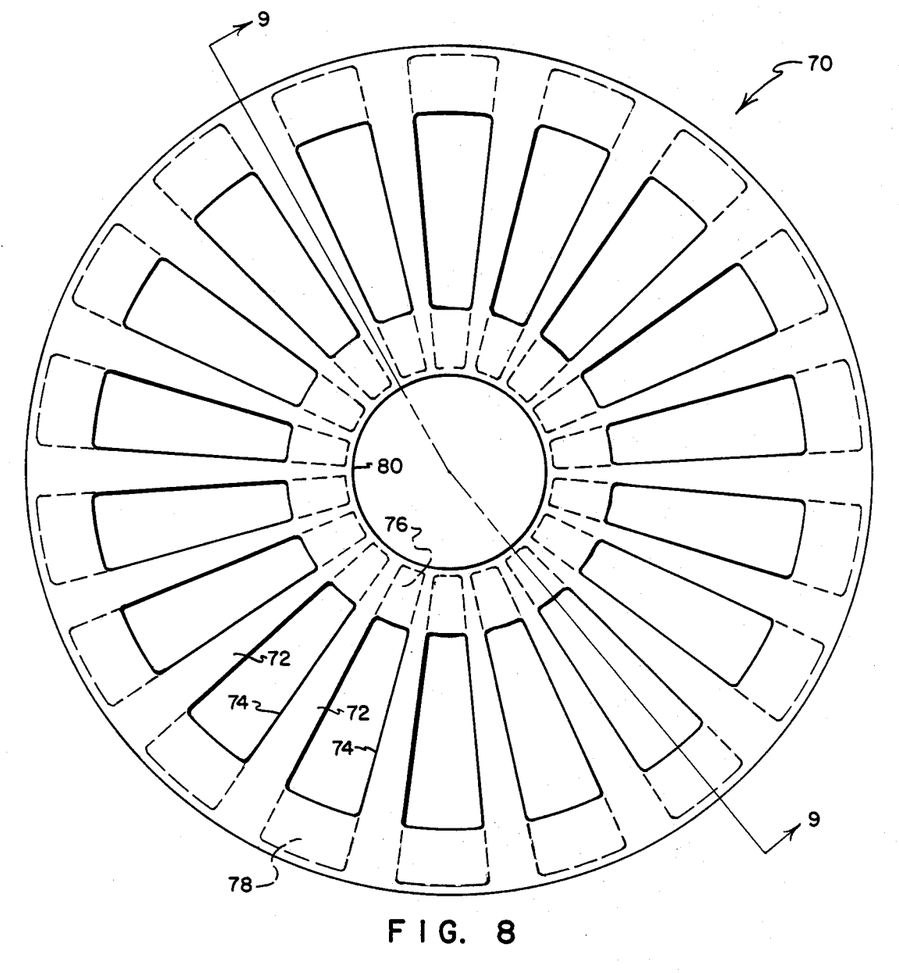
FIG. 8 is a top plan view of one of several convector plates utilized to separate vertically-stacked coils of a charge of metal positioned for treatment in the apparatus of FIG. 1; and, FIG. 9 is a sectional view as seen from planes indicated by a broken line 9—9 in FIG. 8.
Figure 9:
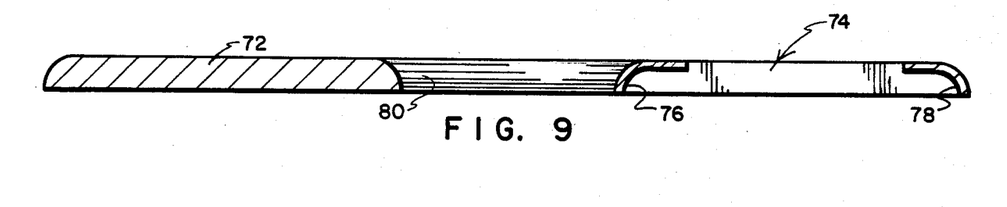

Referring to FIGS. 8 and 9 in conjunction with FIG. 1, the convector plate 70 is shown as being formed from a one-piece cast structure, having a generally annular configuration. Spaced, radially-extending support ribs 72 extend between spaced, radially-extending open sectors 74. Curved inner and outer formations 76, 78 are provided at the inner and outer ends of the open sectors 74, respectively, for facilitating the flow of non-oxidizing gases between adjacent end regions of the stacked coils 32, 34. A central opening 80 defines a restricted flow orifice, the size of which is selected to assist in providing the desired type of gas flow circulation within the controlled, closed environment. The convector plate 70' is identical to the plate 70 and operates in a similar manner to facilitate the desired type of gas flow between the ends of the coils 34, 36 as well as downwardly through the stack 30 of coils 32, 34, 36. Features of the plate 70' which correspond to the described features of the plate 70 are indicated in FIG. 1 with "primed" numerals that are otherwise the same as the numerals used to describe the plate 70.

While features of the present invention such as the provision of a base structure 50 having a top wall 58, a ring structure 110 having a cast-in-situ cooling conduit 114 and a depending skirt 118, and convector plates 70, 70' having curved, scoop-like inner and outer formation 76, 78, have been described and illustrated as being used in combination with each other, these features may also be used independently one from another, and are, accordingly, claimed independently as well as in combination in the claims which follow.

While the technique for forming cooling conduits which are cast-in-situ within nodular iron castings has been described in conjunction with the provision of a specific type of casting (namely the ring structure 110) utilized for one specific purpose (namely to cool gases which pass by the ring structure 110 during the cooldown portion of an annealing cycle), this technique may be used to provide others of the castings of the described system, or castings utilized in other high heat environments with cooling conduits wherein the circulation of cooling fluid through the castings is intended to serve other purposes such as prolonging the service life of the castings.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed. While the base, ring and convector plate structures 50, 110, 70, 70' have been shown and described as being formed from single castings, these annular structures may also be formed as segments which can be bolted together or otherwise suitably connected to form the required configurations. While orientation terms as "upwardly," "downwardly," "inwardly," "outwardly" and the like have been utilized in describing the invention, these terms should not be interpreted as being limiting. It is intended that the patent shall cover, by suitable expression in the appended claims, whatever features of patentable novelty exist in the invention disclosed.

I claim:

1. A convection diffuser and charge support system for an annealing furnace, comprising:
   (a) a generally annular base structure having inner and outer portions that define substantially concentric circles that are radially spaced one from the other, the base structure being formed from at least one base structure casting, the base structure casting having as integral formations thereof a bottom wall, a top wall, a plurality of curved vane structures that extend substantially vertically between and interconnect the top and bottom walls to define an array of curved, substantially horizontally extending primary flow passage means which underlie and are shielded from above by the integrally formed top wall of the base structure casting, with the top and bottom walls of the base structure casting being of generally annular configuration when viewed from above, and with the curved primary flow passage means having inner and outer openings near the inner and outer portions of the base structure for ducting gas flows along curved, radially-outwardly-directed paths that extend from the inner opening toward the outer opening;
   (b) the base structure casting also having a plurality of vane structure extensions which project upwardly from the top wall, the extensions having upper edge portions which extend in a common horizontal plane for receiving and supporting a charge of material to be annealed, which charge is generally annular in configuration when viewed from above,
   (c) a base-encircling ring structure separately fromed from at least one relatively massive ring structure casting, the ring structure casting being configured and disposed to surround and closely receive peripheral portions of the base structure casting, said ring structure defining an array of curved, upwardly-opening flow passage means which cooperate with the horizontally extending primary flow passage means of the base structure casting for ducting gases that discharge from the primary flow passages and for ducting such discharged gases upwardly along generally helical paths of flow about a charge of material which is positioned atop the base structure for annealing, and,
   (d) a cooling conduit within said ring structure casting for ducting cooling fluid therethrough, said conduit being disposed in said casting in non-obstructing relation to said upwardly-opening flow passage means.

2. The convection diffuser and charge support system of claim 1 wherein the base structure casting is formed from nodular cast iron.

3. The convection diffuser and charge support system of claim 1 wherein the ring structure casting is formed from nodular cast iron.

4. The convenction diffuser and charge support system of claim 1 wherein:
   (a) the top and bottom walls of the base structure casting each have an inner diameter and an outer diameter;
   (b) the outer diameter of the top wall is greater than that of the bottom wall whereby the top wall serves to shield the outer openings of the primary flow passage means; and,
   (c) the top wall overlies portions of the ring structure casting and shields radially inward portions of the curved, upwardly-opening flow passage means which are formed in the ring structure casting.

5. The convection diffuser and charge support system of claim 1 wherein the top wall, when viewed in cross section, defines dish-shaped upper surface means that curve slightly upwardly as it extends radially outwardly in the vicinity of its perimeter for ducting portions of such gases as flow downwardly through an annular-shaped charge of material that is positioned atop the vane structure extensions along paths of flow that extend between adjacent ones of the vane structure extensions for recombination with other portions of said flow which have travelled through the primary flow passage means.

6. The convection diffuser and charge support system of claim 1 wherein the ring structure has a continuous depending skirt formed integrally with the ring structure casting and projecting downwardly from its periphery.

7. The convection diffuser and charge support system of claim 1 additionally including annular convector plate means for insertion between adjacent end regions of a pair of stacked coils which comprise an annular charge that is to be annealed, the convector plate means including an annular convector plate structure formed as at least one convector structure casting, and having an alternating array of radially extending ribs and open sectors for supporting one of the coils atop the other while defining flow paths for circulation of gases therebetween.

8. The convection diffuser and charge support system of claim 7 wherein the convector structure casting is formed from nodular iron.

9. A convection diffuser and charge support system for an annealing furnace, comprising:
   (a) a base structure for supporting a charge of material to be annealed;
   (b) a ring structure formed from at least one ring structure casting configured to be positioned adjacent to the base structure for intercepting a flow of gases passing by the base structure; and,
   (c) the ring structure casting having a cast-in-situ cooling conduit for cooling the flow of gases passing by the base structure, with said cooling conduit being disposed in non-obstructing relation to the flow of gases passing the ring structure casting wherein the ring structure and its cast-in-situ cooling conduit have been formed by a process that includes the steps of:
   (i) preparing a sand mold cavity defining exterior surfaces of the ring structure casting to be formed;
   (ii) preforming a steel pipe with a desired shape for a cooling conduit to be provided in the ring structure casting, and having terminal extensions which project from the mold cavity such that the terminal portions will project from the ring structure casting after it has been cast;
   (iii) substantially filling the preformed pipe with sand;
   (iv) pouring molten metal into the mold cavity to fill the mold cavity;
   (v) congealing the molded ring structure casting; and,
   (vi) removing the sand from the preformed pipe.

* * * * *